United States Patent [19]

Yoshida et al.

[11] Patent Number: 5,717,941
[45] Date of Patent: Feb. 10, 1998

[54] ELECTRONIC FILE SYSTEM FOR STORING DOCUMENTS WITH FRONT AND BACK PAGES

[75] Inventors: Kouichirou Yoshida, Fukuoka; Yuji Ishitsu, Fukuoka-ken, both of Japan

[73] Assignee: Matsushita Electric Industrial Co., Ltd., Osaka, Japan

[21] Appl. No.: 433,728

[22] Filed: May 3, 1995

[30] Foreign Application Priority Data

May 11, 1994 [JP] Japan .................................. 6-097241
May 11, 1994 [JP] Japan .................................. 6-097242

[51] Int. Cl.[6] .................................................. G06T 11/00
[52] U.S. Cl. ................................................................ 395/787
[58] Field of Search ............................... 395/787, 761, 395/766, 767, 779, 784, 785, 786, 788, 789

[56] References Cited

U.S. PATENT DOCUMENTS

| | | | |
|---|---|---|---|
| 5,253,337 | 10/1993 | Hirose | 395/161 |
| 5,289,569 | 2/1994 | Taniguchi | 395/787 |

Primary Examiner—Almis R. Jankus
Attorney, Agent, or Firm—Watson Cole Stevens Davis, P.L.L.C.

[57] ABSTRACT

An electronic file system can handle documents each having data indicated on its face and back sides according to its actually printed form. The system wholly or partially includes an apparatus for registering the document having data printed on its face and back sides in association with the face and back sides, an apparatus for shifting a current display from the face side of the face and back sides of the document registered as mutually associated with each other to the back side or from the back side to the face side, an apparatus, when the face side appears on the current display screen for example, for shifting the then display to the face side of the previous page or to the face side of the next page, an apparatus for rotating, enlarging and/or reducing the read image, and an apparatus for combining the face and back side data of the document having data printed on its face and back sides into a single screen of data.

4 Claims, 17 Drawing Sheets

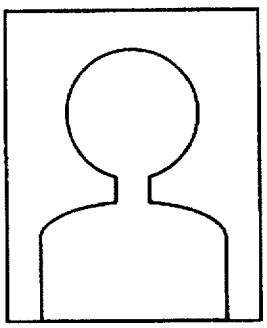

ELECTRONIC FILE SYSTEM FOR STORING DOCUMENTS WITH FRONT AND BACK PAGES

BACKGROUND OF THE INVENTION

1. Field of the Invention

The present invention relates to an electronic file system which is suitable for management of a document for information to be printed on its face and back sides.

2. Description of the Related Art

There has been conventionally widely utilized as a tool for managing an enormous amount of documents an electronic file system which converts a large amount of documents to data and records the data onto such a recording medium as magneto-optical disk.

Explanation will next be made as to a prior art electronic file system.

FIG. 20 shows a data structure of an interior of such a recording medium as magneto-optical disk in a prior art electronic file system, which includes a file manager 101 for storing therein file management information for management of image information in the form of a file and an image memory 102 for storing therein image data of respective pages of a document read out by an image scanner. Each of the file management information of the file manager 101 is made up of the name of a file and pointers (addresses at which the image data of the respective pages in the image memory 102 are stored) of the respective pages of the file to associated image data. Therefore, when it is desired to output image information of a document registered in the recording medium, designation of its file name and a desired page number causes the corresponding image data to be read out from the image memory 102 and then output to a display or a printer.

Meanwhile, the prior art electronic file system is intended to be used in management of documents such as sheets of paper which all have information printed only on their one side.

However, since documents include name cards, check sheets and bond sheets to be endorsed, curriculum vitae and personnel recording sheets to be filled therein, that is, having information printed or filled on their both sides; the prior art electronic file system has had a problem that it is hard for the system to handle such a sheet document as to have information printed on its face and back sides.

SUMMARY OF THE INVENTION

It is therefore an object of the present invention to provide an electronic file system which can handle documents each having data indicated on its face and back sides according to its actually printed form.

An electronic file system in accordance with the present invention wholly or partially comprises a means for registering the document having data printed on its face and back sides in association with the face and back sides, a means for shifting a current display from the face side of the face and back sides of the document registered as mutually associated with each other to the back side or from the back side to the face side, a means, when the face side appears on the current display screen for example, for shifting the then display to the face side of the previous page or to the face side of the next page, a means for rotating, enlarging and/or reducing the read image, and a means for combining the face and back side data of the document having data printed on its face and back sides into a single screen of data.

BRIEF DESCRIPTION OF THE DRAWINGS

FIG. 11 is an example of display in the electronic file system of the embodiment of the invention;

FIG. 12 is an example of display in the electronic file system of the embodiment of the invention;

FIG. 13 is an example of display in the electronic file system of the embodiment of the invention;

FIG. 14 is an example of display in the electronic file system of the embodiment of the invention;

DESCRIPTION OF THE PREFERRED EMBODIMENTS

Figure 1:
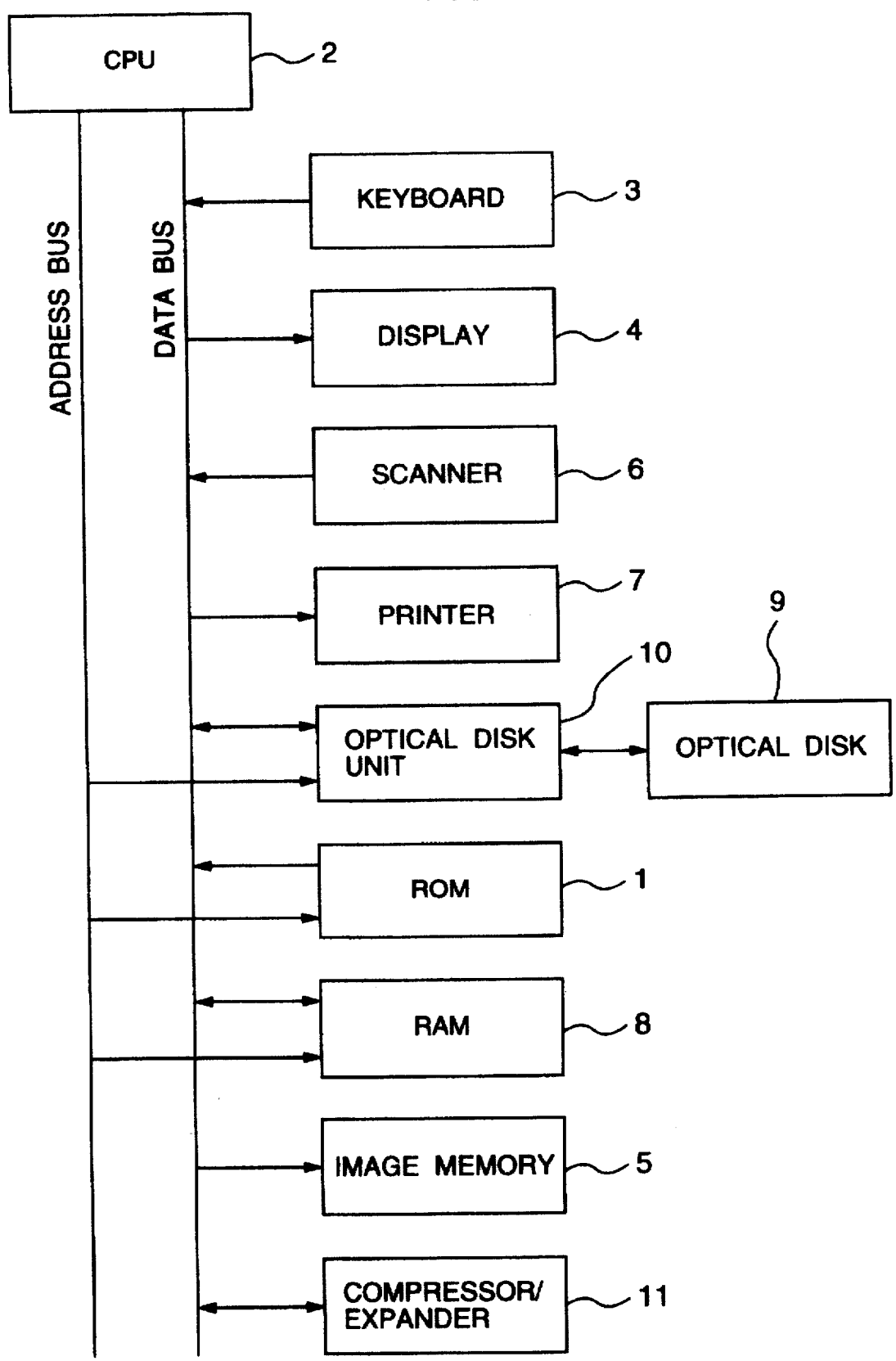
FIG. 1 is a block diagram of an electronic file system in accordance with an embodiment of the present invention.
Figure 2:
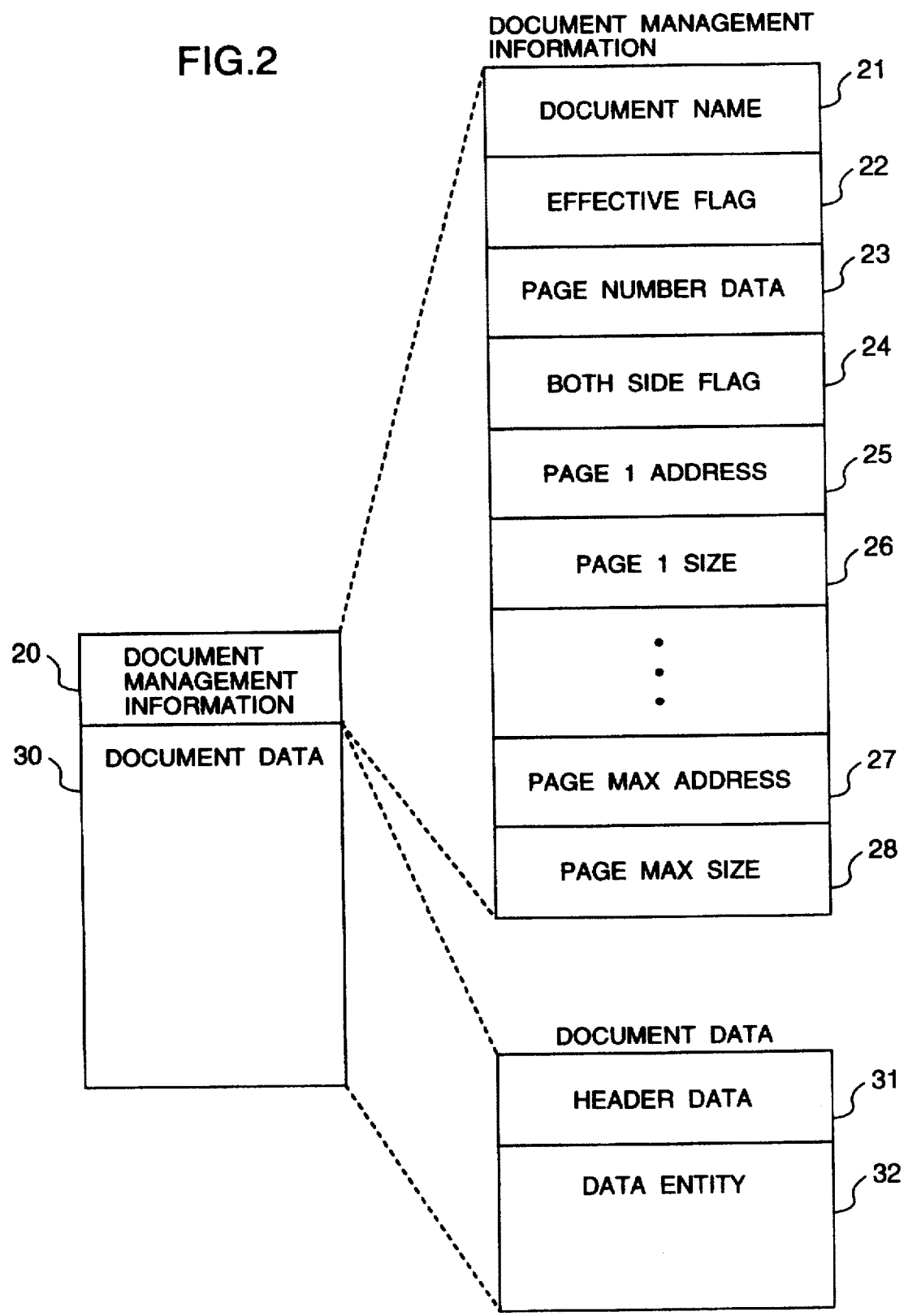
FIG. 2 shows a data structure of an interior of an optical disk for use in the electronic file system of the embodiment of the invention.

An electronic file system in accordance with an embodiment of the present invention will be explained with reference to the accompanying drawings. FIG. 1 is a block diagram of an electronic file system in accordance with an embodiment of the present invention, FIG. 2 is a data structure of an optical disk for use in the electronic file system, and FIGS. 3 to 10 show flowcharts for explaining different control programs for used in the electronic file system. Referring first to FIG. 1, the illustrated electronic file system includes a read only memory (ROM) 1 for storing therein the control programs based on the flowcharts of FIGS. 3 to 10, a central processing unit (CPU) 2 for executing the control programs in the ROM 1 and also for controlling other constituent elements of the system, a keyboard 3 through which a user enters necessary information into the system, a display 4 for displaying contents of a document or the like thereon, an image memory 5 in which image data to be displayed on the display 4 is loaded, a scanner 6 for reading image information from an original document (not shown), a printer 7 for printing data on a printing sheet, a random access memory (RAM) 8 for reading out and writing data necessary for execution of the control programs therefrom and therein, an optical disk 9 for storing therein a document file having such a structure as shown in FIG. 2, an optical disk unit 10 for driving the optical disk 9, and a compressor/expander 11 for expanding/compressing the contents data of a document file after the data is read out from the optical disk 9 or before the data is written therein.

As shown in FIG. 2, the structure of the document file has document management information 20 and document data 30. More specifically, the document management information 20 includes a document name 21, an effective flag 22 which is set at "1" in the presence of a document (when a document is used) and at "0" in the absence of a document, page number data 23 indicative of a total number of pages of a registered document (page number being counted as 2, for example, when the first page has data printed on its face and back sides), and a both-side flag 24 indicative of data on concatenation between one of "face" and "back" sides of odd-numbered one of the pages of the document and the other side of the next even-numbered page.

When the both-side flag 24 is set at "1" for example, mutually adjacent odd- and even-numbered pages in the document are concatenated as the face and back side of a single sheet. This means that, when the both-side flag 24 is set at "1" and the page number data 23 has "1", this indicates the face side of the first page of the document; when the both-side flag 24 is set at "1" and the page number data 23 has "2", this indicates the back side of the first page; and, when the both-side flag 24 is set at "1" and the page number data 23 has "3", this indicates the face side of the second page of the document. Of course, it will be appreciated that the relationship between the page number data 23 and the page "face" and "back" sides of the document may be modified in various ways.

The document management information 20 further includes a page-1 address 25 indicative of the leading address of the first page, a page-1 size 26 indicative of the size of the page 1, . . . , and a page-max address 27 indicative of the leading address of a maximum number of pages registerable per document and a page-max size 28 indicative of the size of the page max (last page).

The document data 30, on the other hand, has an data entity 32 and header data 31 indicative of the format, size, etc. of the data entity 32. The data entity 32 may include one of image data and character data or both thereof. When the image data is employed as the data entity 32, the header data 31 includes data indicative of the number of vertical-direction dots, the number of horizontal-direction dots, the compression system, etc. When the character data is employed as the data entity 32, the header data 31 includes data indicative of the number of characters per line, the number of lines per page, etc. In the present embodiment, the image data is employed as the data entity 32.

Figure 3:
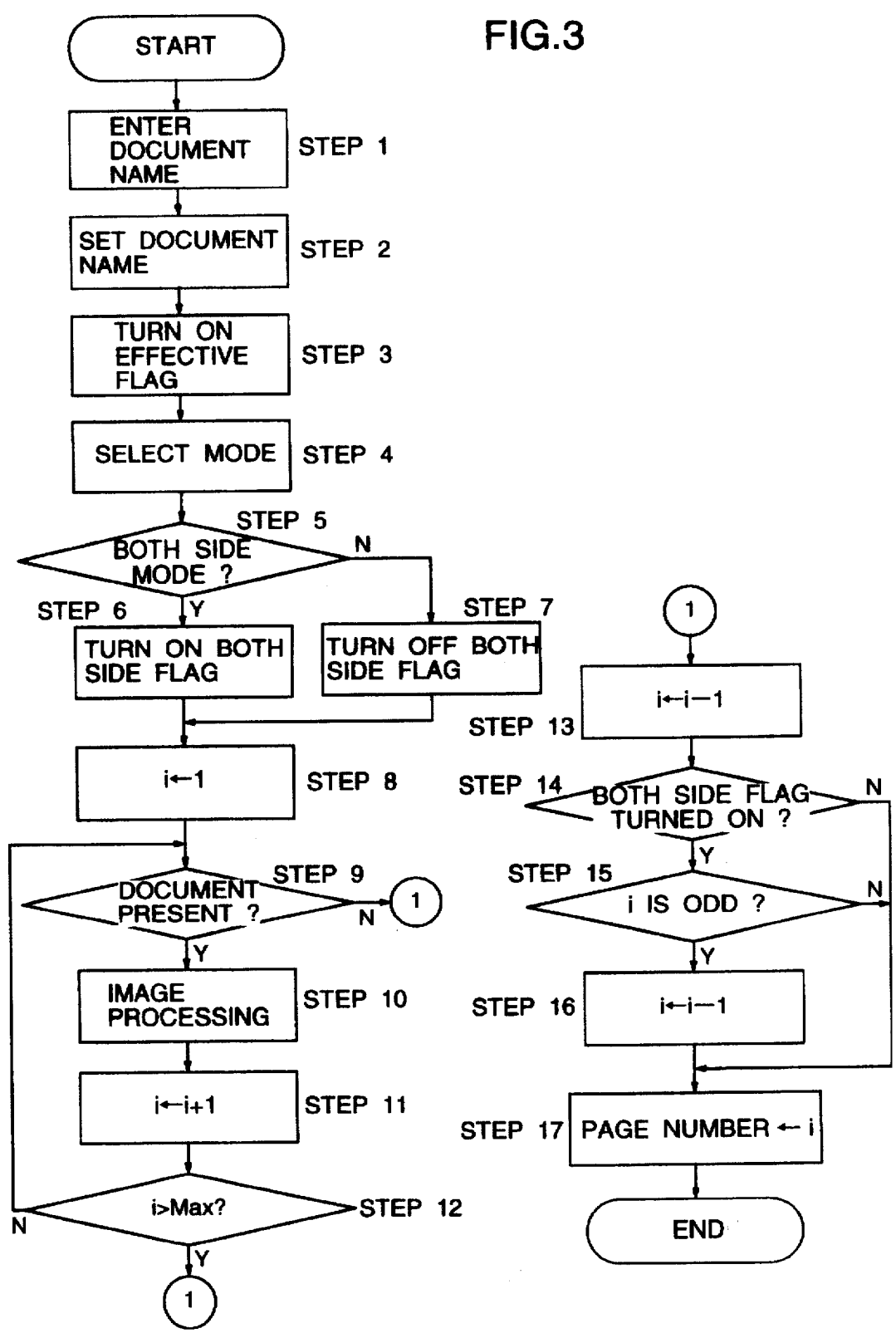
FIG. 3 is a flowchart for explaining a control program used for the electronic file system of the embodiment of the invention.

Explanation will next be made as to a processing flow when a document is newly registered by referring to FIGS. 3 and 4. First of all, the user enters the name of the new document (step 1). This causes the system program to search document file for the document for which the effective flag 22 indicative of the presence or absence of the registered document is set at "0" and which is not registered yet. And the system program sets the suitable document name in the document name 21 (step 2) and sets the effective flag 22 at "1" (turns ON the flag) (step 3).

The user selectively determines whether to put the document in its both-side mode using the both face and back sides (step 4). The selection of the both-side mode (step 5) causes the system program to set the both-side flag 24 at "1" (to turn ON the flag) (step 6); whereas, otherwise, the system program sets the both-side flag 24 at "0" (turns OFF the flag) (step 7).

Then sheet number counter i is set at "1" (step 8) and it is examined whether an original document is set (placed) on the scanner 6 (step 9). If the document is not set, then the program transfers its control to a step 13; whereas, if so then the program goes to a step 10 and executes image operation.

Figure 4:
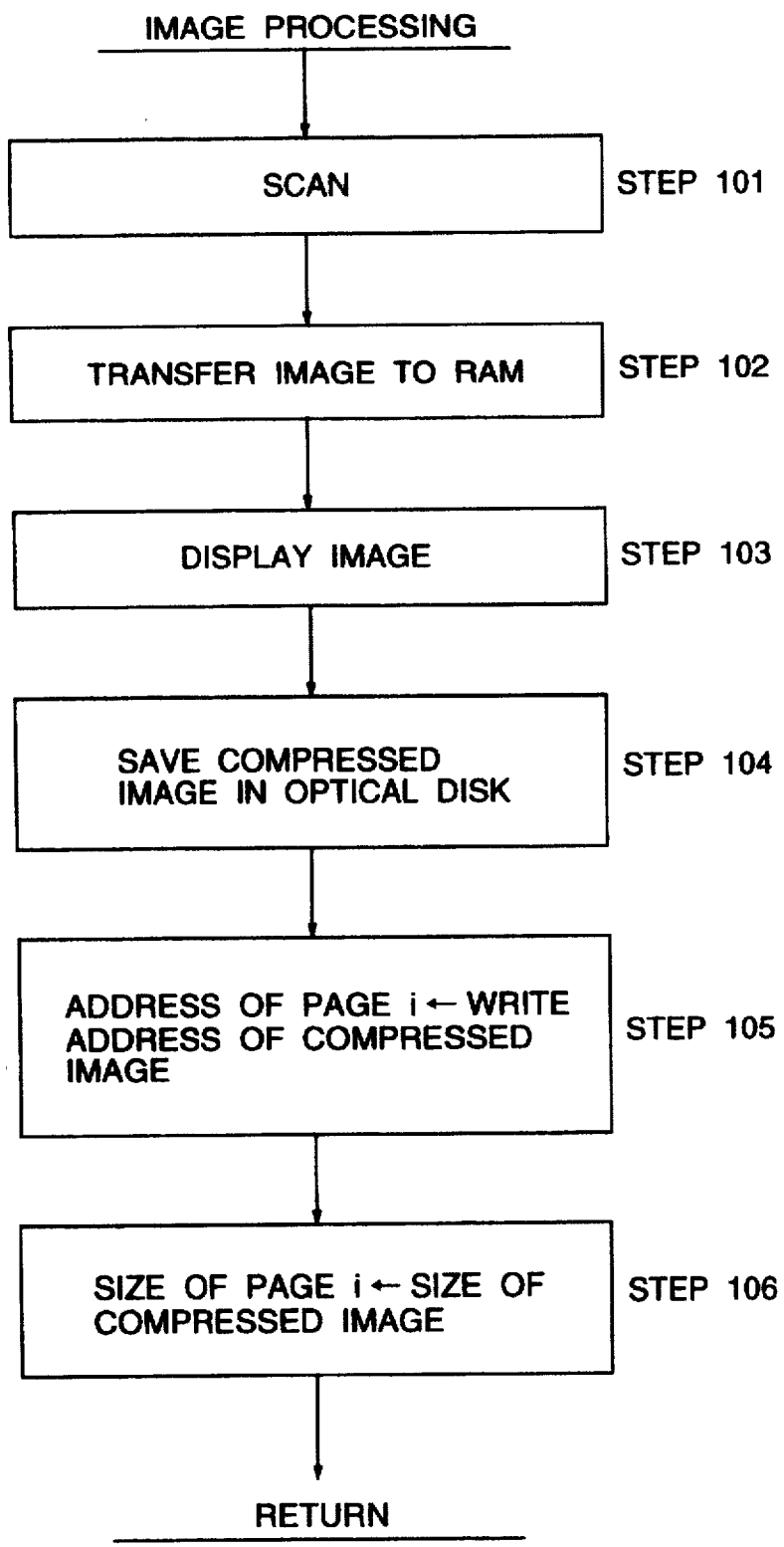
FIG. 4 is a flowchart for explaining a control program used for the electronic file system of the embodiment of the invention.

More in detail, when an original document is set on the scanner 6 and the image operation is to be carried out, the document is scanned to read data therefrom (step 101) and the read image data is once transferred to the RAM 8 (step 102), as shown in FIG. 4. The image data is loaded in the image memory 5 to be displayed on the display 4 (step 103). On the data displayed on the display 4, the user can confirm that the first page of the document was read. And the CPU 2 sends the image data transferred to the RAM 8 again to the compressor/expander 11 to compress the data, and also instructs the optical disk unit 10 to store the image data subjected to the compression in the data entity 32 of the optical disk 9 (step 104). The CPU 2 also instructs the optical disk unit 10 to save the head address of the compressed image data stored at the page-1 address 25 of the page 1 and to save the size of the same data in the page-1 size 26 of the page 1 (steps 105 and 106).

Turning back to FIG. 3, control goes to a step 11 to increment the sheet number counter i (step 11) and it is confirmed that the count number fails to reach the maximum number of registerable pages (step 12), so that the operations of the steps 9 to 12 are repeated until the sheets of the document are all read. After the reading of all the document sheets is completed, the sheet number counter i has a count corresponding to the number of read pages plus "1". Thus the sheet number counter i is decremented by "1" (step 13) and then it is examined whether or not the both-side flag 24 is set at "1" (turned ON) (step 14). If the both-side flag 24 is set at "1", then control goes to a step 15; whereas, if not then control branches to a step 17. When the both-side flag 24 is set at "1", it is examined whether or not the sheet number counter i has an odd count value. When the count value is an odd number, the count is forcibly decremented to an even number (step 16); whereas, when the count is an even number, the count value of the sheet number counter i remains not changed and set in the page number data 23 (step 17), at which point the operation ends. When the face and back sides are handled, the operation of the step 16 should result in that the count number of the sheet number counter i is an even number, thus causing no confliction.

Explanation will then be made as to an operation flow when a document stored in the optical disk is displayed, by referring to FIGS. 4 to 8 and FIGS. 11 to 14. FIGS. 11 to 14 show examples of image appearing on the display in the electronic file system in accordance with the embodiment of the present invention.

Figure 5:
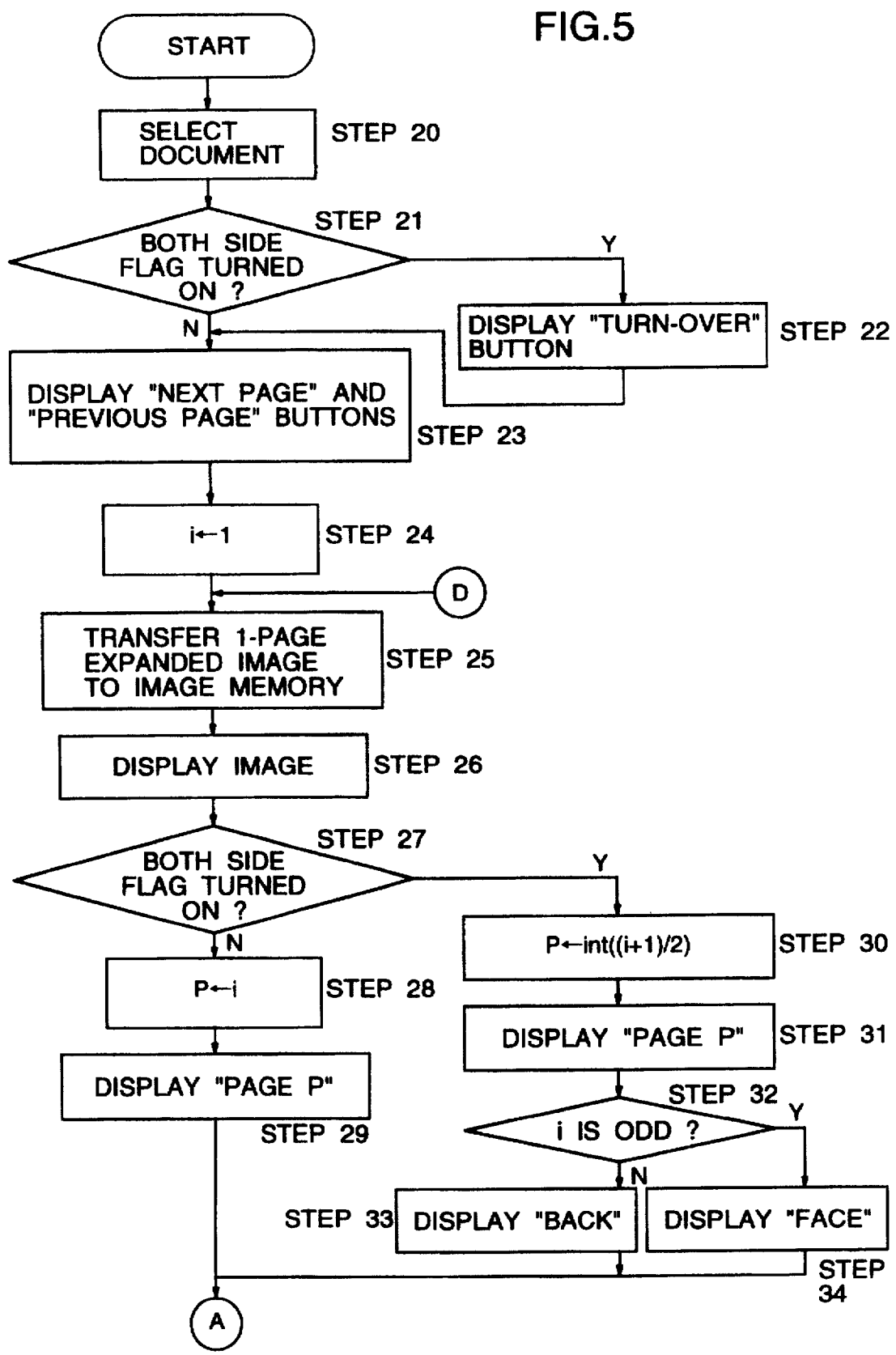
FIG. 5 is a flowchart for explaining a control program used for the electronic file system of the embodiment of the invention.

More specifically, first of all, the user selects one of the documents to be displayed in the step 20 of FIG. 5. That is, the CPU 2 examines whether or not the both-side flag 24 for the selected document file is set at "1" (step 21). If the both-side flag 24 is set at "1", then the CPU 2 displays a "turn-over" button on each of "face" and "back" screens of the display 4 (step 22). When the both-side flag 24 is not set at "1", the page has no "face" or "back", which results in that such a "turn-over" button is not displayed and only "next page" and "previous page" buttons are displayed (step 23).

The CPU 2 sets the sheet number counter i at "1" (step 24), refers to the page-1 address 25, passes the compressed image data present in the data entity 32 to the compressor/expander 11 to expand the data, and loads the expanded image data in the image memory 5 (step 25). This causes the image data to be displayed on the screen of the display 4 (step 26).

Subsequently, the CPU 2 again examines the both-side flag 24 to display the page on the display screen. That is, when the both-side flag 24 has "1", control goes to a step 30; whereas, when the both-side flag 24 fails to have "1", control branches to a step 28.

When the both-side flag is not set at "1", the face/back mode is not employed for the document, so that the displayed page number P has a serial of numbers of the sheet number counter i in the step 28 and "page P" sequentially appear on the associated display screens in a step 29.

Under this condition, an example of personnel record display is given in FIGS. 11 and 12. "page 1" appears in an upper right part of FIG. 12, click buttons of "previous page" and "next page" appear in a lower part of the screen. That is, when the both-side flag 24 is not set at "1", the respective pages are all handled as having only "face", which produces such screen displays as shown in FIGS. 11 and 12 regardless of "face" and "back" of each page. And even when FIGS. 11 and 12 have some relationship therebetween, they are regarded as mutually independent documents and have page representations having consecutive numbers.

When the "previous page" button is clicked, a page one-previous to the page currently being displayed is displayed; while, when the "next page" button is clicked, a page one-subsequent to the page currently being displayed is displayed.

Meanwhile, when the both-side flag 24 is set at "1" in the step 27 of FIG. 5, the number of sheets is equal to the number of pages so that the display page number P is calculated as P=int ((i+1)/2) (step 30), where int (x) is a function for dropping the fractional portion of a number x.

For example, if i=1 then P=1; if i=2 then P=1; if i=3 then P=2; if i=4 then P=2, and so on. That is, i=1 and i=2 correspond respectively to a "face" "back" relationship of the same page, so that their display page number P is both "1". In this way, P is calculated and "page P" is displayed on the screen (step 31). Further, when the sheet number counter i has an odd number, "back" is displayed together with the representation "P" on the screen (steps 32 and 34); whereas, when the sheet number counter i has an even number, "back" is likewise displayed (steps 32 and 33).

Figures 13, 14:
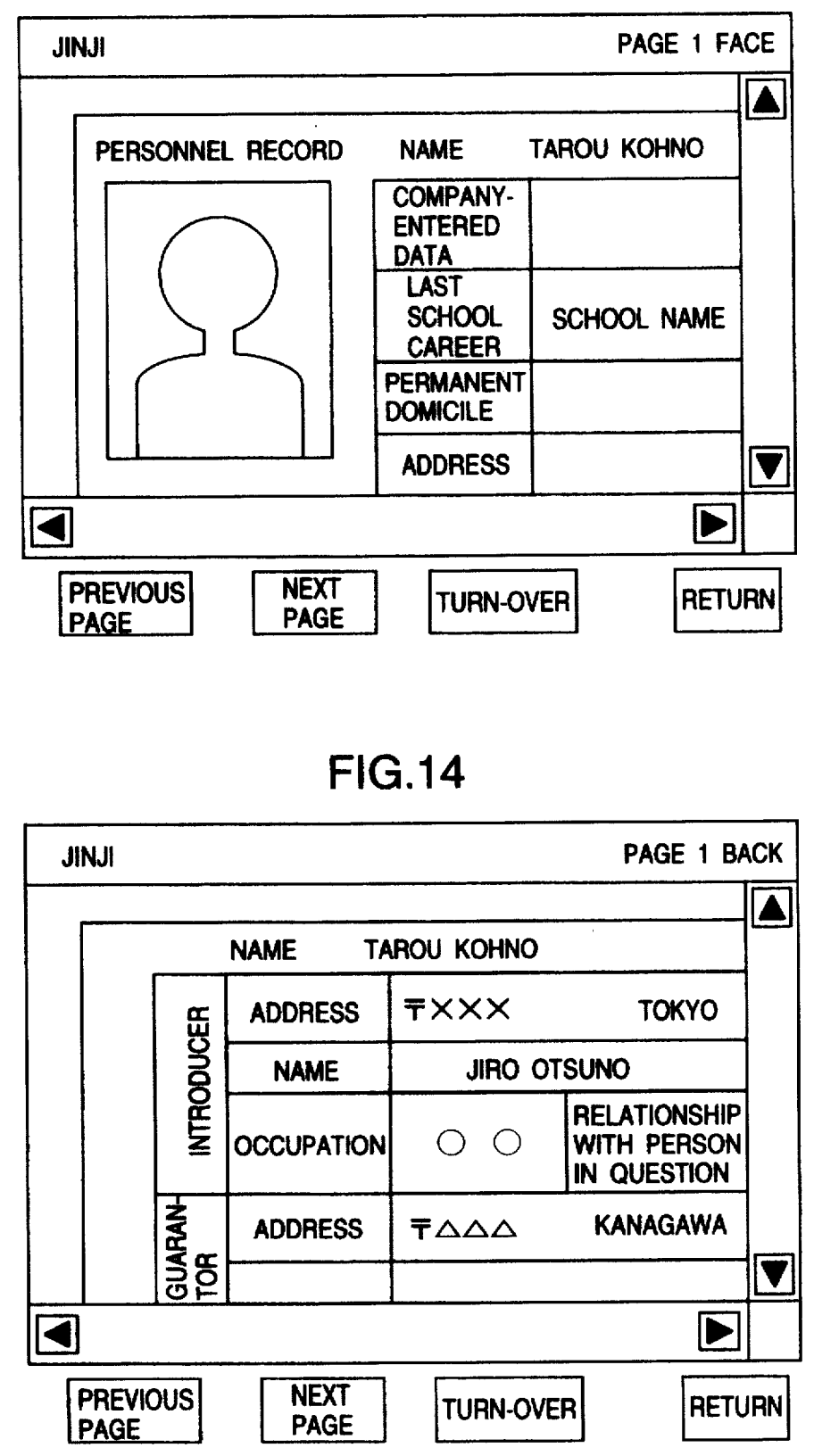

The above case is shown in FIGS. 13 and 14. The screen display of the FIGS. 13 and 14 are different from that of FIGS. 11 and 12 in that "page 1 face" and "page 1 back" appear in the upper right part of the drawings and the "turn-over" button appears in the lower part thereof.

More in detail, the screen displays of FIGS. 13 and 14 are registered at the first page as mutually related documents. That is, the relationship therebetween is that the "face" side of the page 1 is as shown in FIG. 13 while the "back" side of the page 1 is as shown in FIG. 14.

The displayed "turn-over" button is a function key for being specified when it is desired to shift the "face" surface to the "back" surface or from the "back" surface to the "face" surface. For example, when the "turn-over" button is clicked or specified during the appearance of the "face" surface (see FIG. 13) of the page 1, the "back" surface (see FIG. 14) of the page 1 appears. Similarly, when the "turn-over" button is clicked or specified during the appearance of the "back" surface of the page 1, the "face" surface of the page 1 appears.

The "turn-over" operation will be explained in more detail with reference to FIG. 6. In a step 35 of FIG. 6, the CPU 2 examines whether or not the "turn-over" button was 'depressed' or clicked. If the CPU 2 determines the click of the "turn-over" button, then control goes to a step 38; whereas, if not then control goes to a step 36. When the both-side flag 24 is now not set at "1", the "turn-over" button itself is not present (refer to FIG. 11), so that control is transferred always from the step 35 to the step 36. At this time, the 'depression' or click of the "turn-over" button causes the CPU 2 to examine whether the sheet number counter i has an odd or even count number in the step 38.

When the sheet number counter i has an odd count number, the "face" surface appears on the current display screen, and the CPU 2 controls to cause the display to be advanced to the next sheet number corresponding to the "back" of the appeared "face" (step 42). In this connection, prior to the above advancement, check is made so that the advanced sheet number does not exceed the maximum registerable page number (step 41). On the other hand, when the sheet number counter i has an even count number, the "back" surface appears on the current display screen, whereby the CPU 2 controls to cause the display to be returned by one page back, i.e., to the "face" of this page (step 40). And control returns from the step 40, 42 or 41 in FIG. 6 to the step 25 and subsequent steps in FIG. 5.

That is, when the "turn-over" button is clicked under the condition of FIG. 13, the sheet number counter i, which has then an odd count value, advances its count by "1" (step 42 in FIG. 6) to provide such a display as shown in FIG. 14. When the "turn-over" button is clicked under the condition of FIG. 14, the sheet number counter i, which has then an even count value, returns back its count by "1" (step 40) to provide such a display as shown in FIG. 13. In this way, the "turn-over" button corresponds to a turn-over means for alternately switching between the "face" and "back" surfaces of a sheet.

Figure 6:
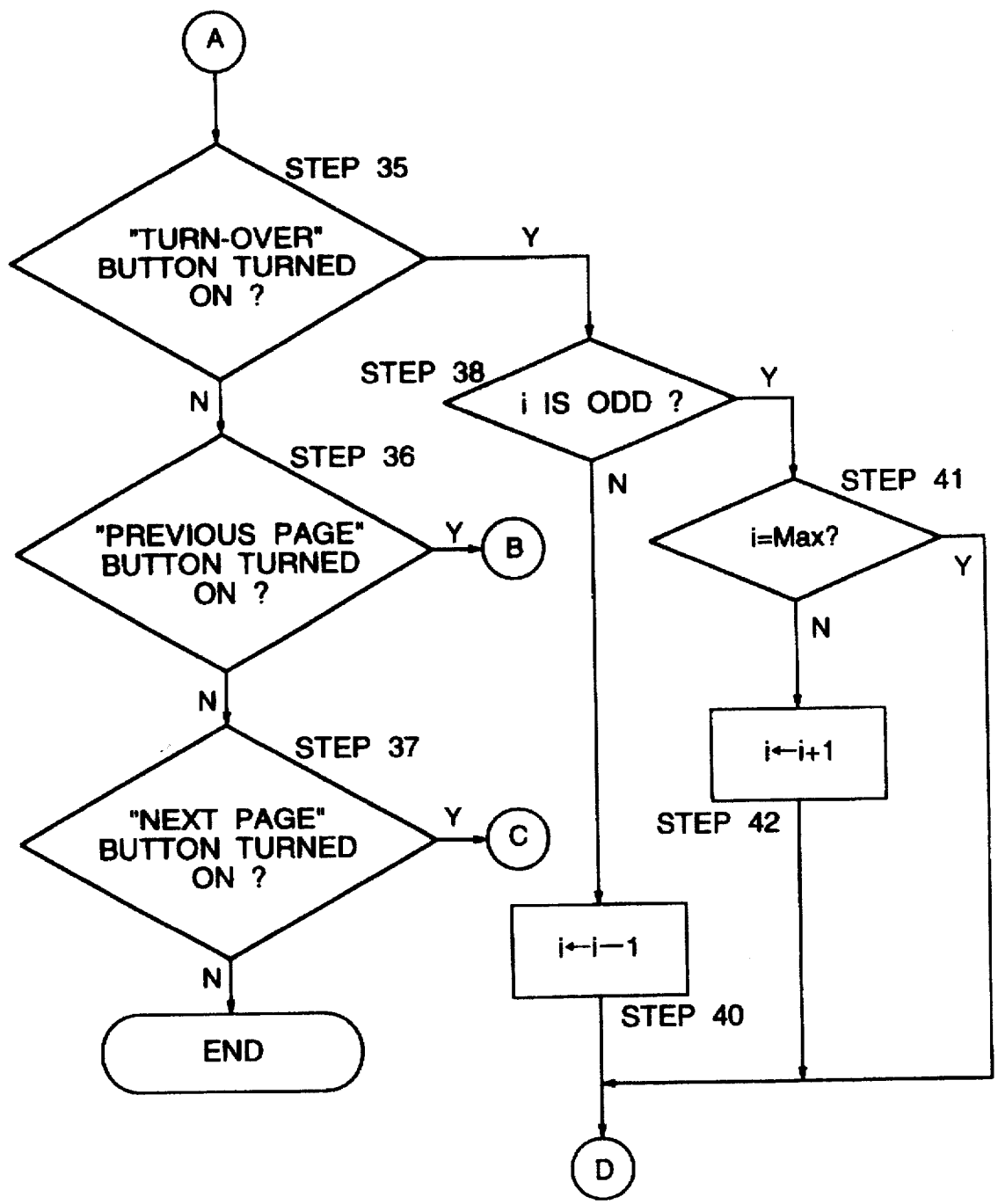
FIG. 6 is a flowchart for explaining a control program used for the electronic file system of the embodiment of the invention.

Then, when the "turn-over" button is not clicked in the step 35 of FIG. 6, the CPU 2 examines whether or not the "previous page" button was clicked (step 36). In the case where the both-side flag 24 is set at "1", i.e., the "face"/ "back" mode is employed, the "previous page" button is used, when the "face" side of a page in the document is being currently displayed, to shift it to the "face" side of a page previous by one page; while, when the "back" side of a page in the document is being currently displayed, to shift it to the "back" side of a page previous by one page.

Figure 7:
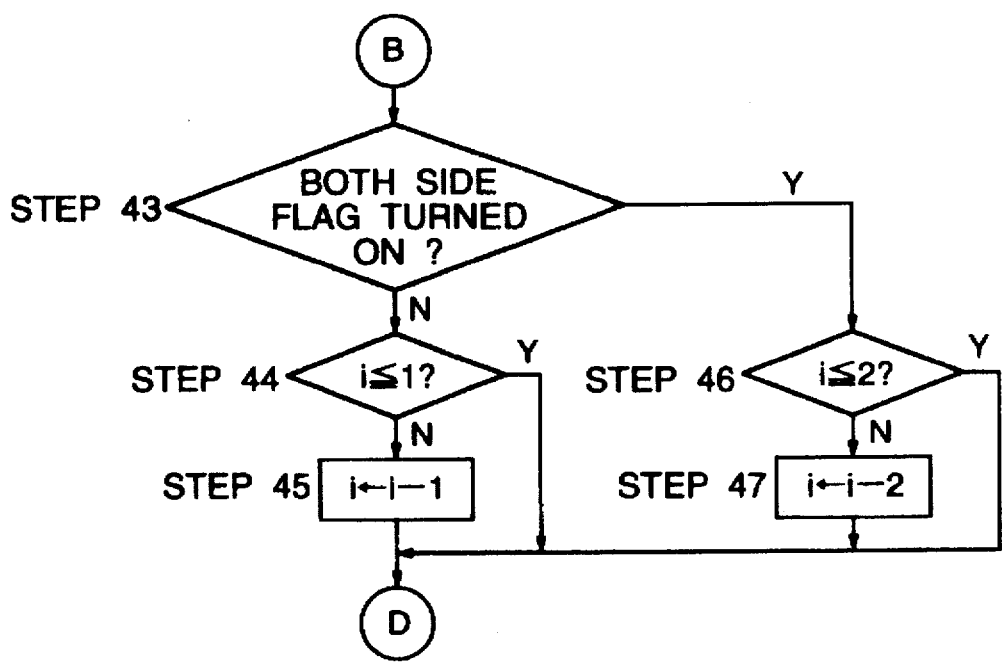
FIG. 7 is a flowchart for explaining a control program used for the electronic file system of the embodiment of the invention.

A click of the "previous page" button causes control to go to a step 43 in FIG. 7, while no click thereof causes control to go to a step 37 in FIG. 6.

A click of the "previous page" button causes the CPU 2 to examine whether the both-side flag 24 is set at "1" (step 43) as shown in FIG. 7. When the both-side flag 24 is set at "1", the CPU 2 judges the mode is the both-side mode and examines whether the sheet number counter i has a count value of 2 or less (step 46). When the sheet number counter i has a count value of 2 or less, this means that there is no previous page. Thus, control returns to the step 25 in FIG. 5 without any operation. When the sheet number counter i has a count value of above 2, the count value of the sheet number counter i is returned by "2" to produce a display of the same "face" or "back" of the one-previous page as the current one (step 47).

Meanwhile, the CPU 2 examines in the step 37 of FIG. 6 whether or not the "next page" button was clicked. A click of the "next page" button causes control to go to the step 48 in FIG. 8, while no click thereof causes the operation to end. The CPU 2 examines in the step 48 of FIG. 8 whether the both-side flag 24 was set at "1". When the both-side flag 24 is set at "1", the count value of the sheet number counter i is advanced by "2" (step 52) but this is done only after it is also confirmed that the count value does not exceed the maximum registerable page number, to thereby produce a display (step 52).

Figure 8:
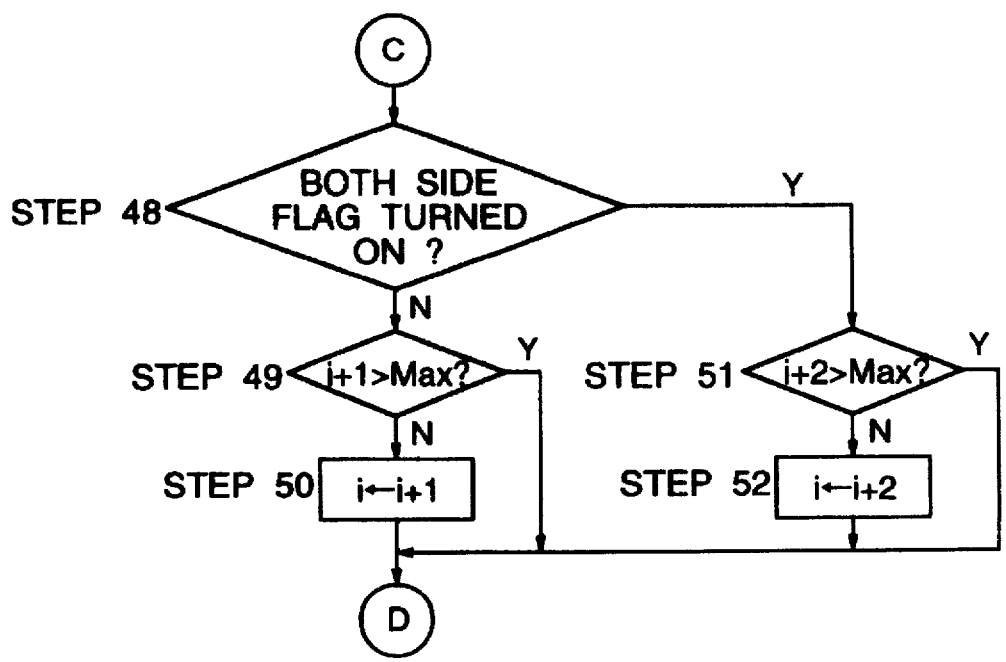
FIG. 8 is a flowchart for explaining a control program used for the electronic file system of the embodiment of the invention.

When the both-side flag 24 is not set at "1" in the step 48 of FIG. 8, on the other hand, it is confirmed in a step 49 that an advancement of the count value of the sheet number counter i by "1" causes the count value not to exceed the maximum registerable page number (step 49), after which the sheet number counter i is advanced by "1" (step 50).

Under the condition of FIG. 11 (when the both-side flag 24 is set at "0"), a click of the "next page" button causes production of such a display as shown in FIG. 12.

Meanwhile, under the condition of FIG. 13 (when the both-side flag 24 is set at "1"), a click of the "next page" button causes production of not the display of FIG. 14 but a display when the sheet number counter i=3 ("face" page). In other words, when the "next page" button is clicked in the display of the page 1 "face", the "face" surface of page 2 is displayed. When the "next page" button is clicked in FIG. 14, a display when the sheet number counter i=4 ("back" page) is produced. In other words, when the "next page" button is clicked in the display of the page 1 "back", the "back" surface of page 2 is displayed.

Figure 9:
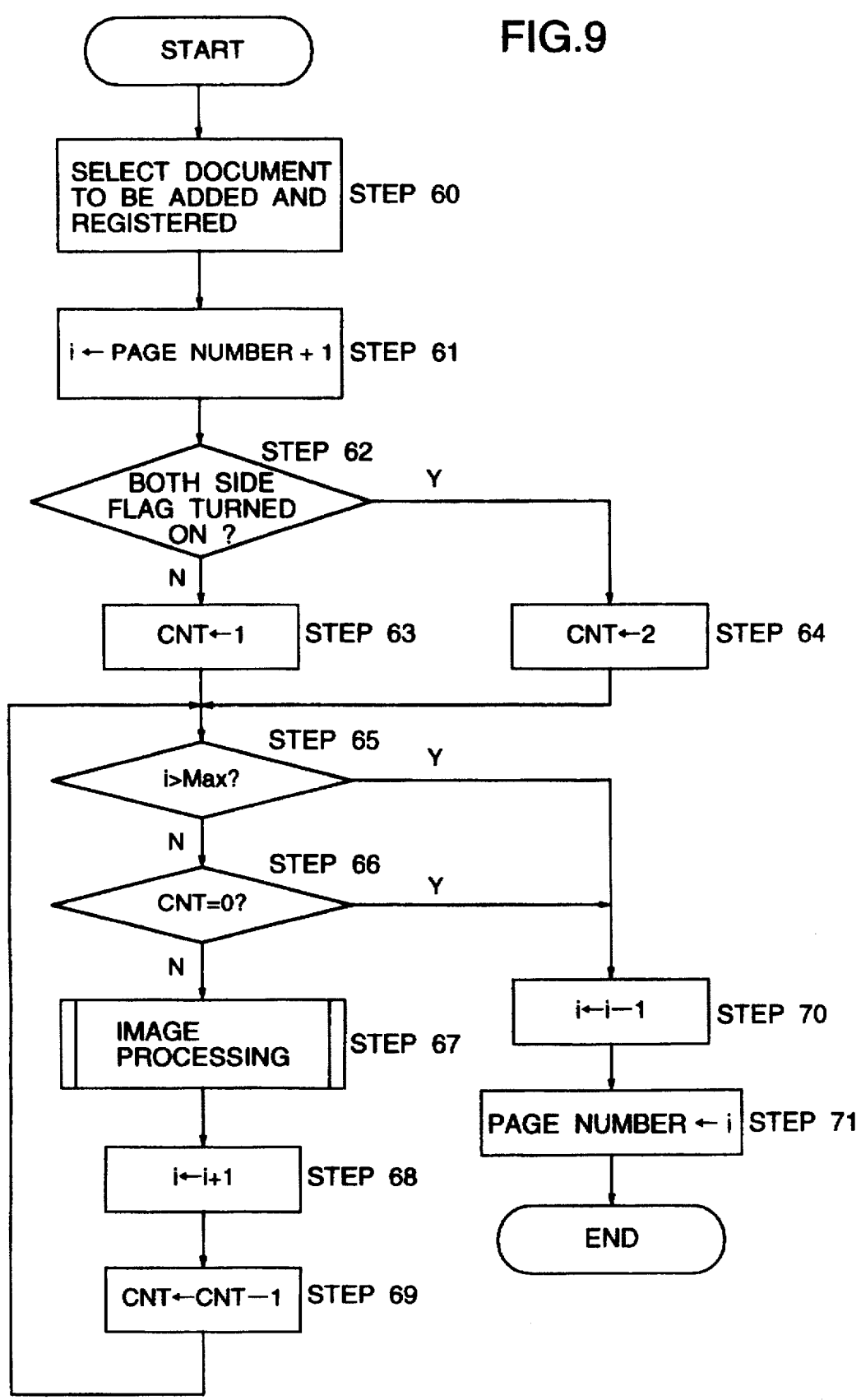
FIG. 9 is a flowchart for explaining a control program used for the electronic file system of the embodiment of the invention.

Explanation will next be made as to how to add pages to the document file already present in the optical disk 9 with reference to FIG. 9. In a step 60, first, the user selects the name of a document file to be added. The CPU 2 refers to the page number data 23 of the corresponding document file and substitutes the page number data 23 plus "1" into the sheet number counter i (step 61). The CPU 2 examines in a step 62 whether or not the both-side flag 24 is set at "1". When the both-side flag 24 is set at "1", processing sheet number CNT is set at "2"(step 64); otherwise, the processing sheet number CNT is set at "1" (step 63). And after it is confirmed that the count value of the sheet number counter i does not reach the maximum registerable page number (step 65), the reading operation is repeated until the processing sheet number CNT becomes 0 (steps 66 to 69). When the processing sheet number CNT reaches 0, the count value of the sheet number counter i is returned by 1 (step 70) and the page number data 23 is updated to the sheet number counter i (step 71).

Figure 10:
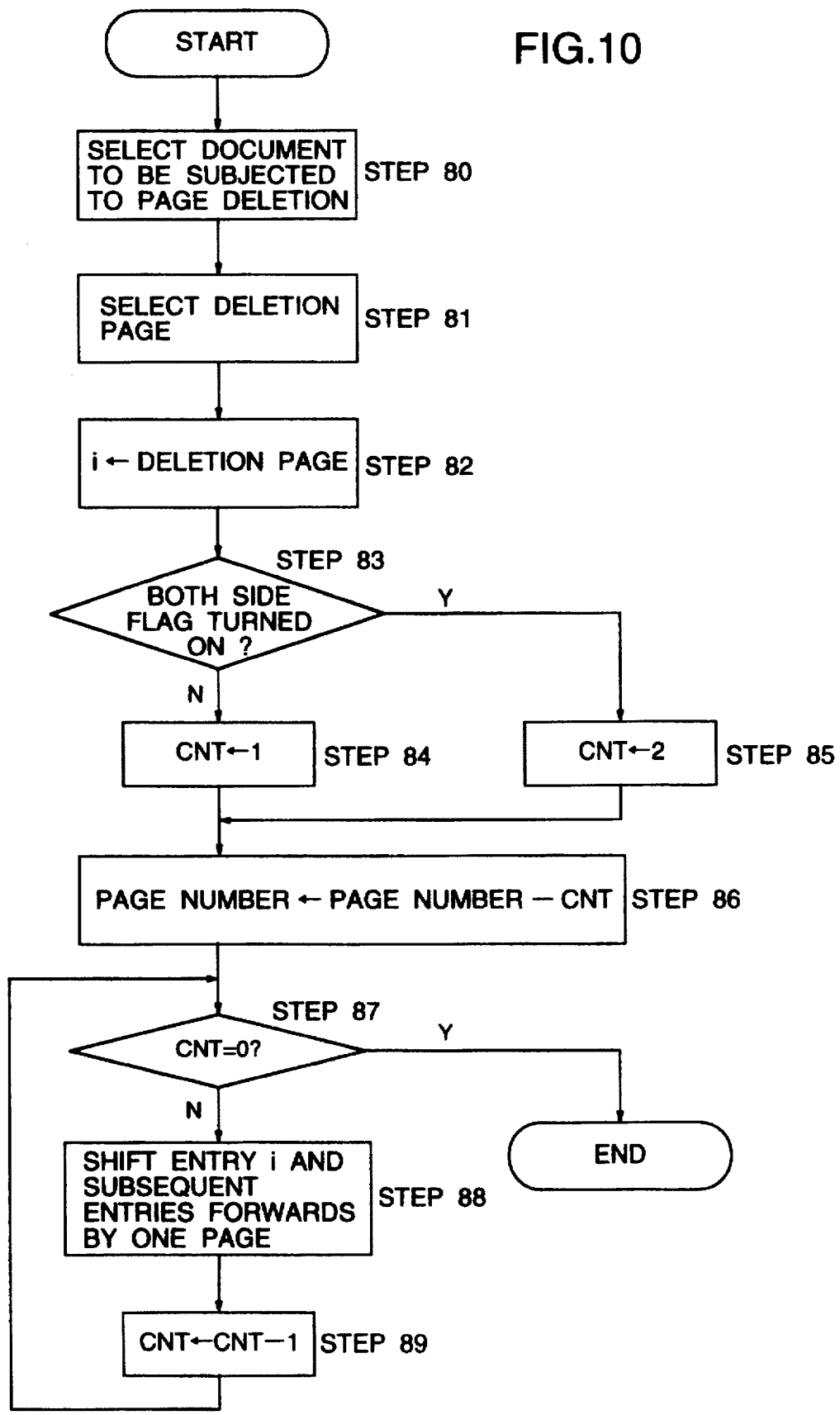
FIG. 10 is a flowchart for explaining a control program used for the electronic file system of the embodiment of the invention.

Next, explanation will be made as to how to delete part of pages of a document file already present in the optical disk 9 by referring to FIG. 10. More in detail, in a step 80, first of all, the user selects a document file to be deleted (step 80) and selects a page or pages to be deleted therein (step 81). Then the total number of pages to be deleted (not the displayed pages but the total number of corresponding sheets) is set at the sheet number counter i (step 82).

And the CPU 2 examines whether or not the both-side flag 24 is set at "1" (step 83). When the both-side flag 24 is set at "1", "2" is set for the processing sheet number CNT (step 85); whereas, when the both-side flag 24 is not set at "1", "1" is set for the processing sheet number CNT (step 84). And the page number data 23 is decreased by the numeral value of the processing sheet number CNT (step 86) and entry is sequentially shifted to the page previous by one page (steps 88 and 89) by the number of times corresponding to the processing sheet number CNT (step 87).

The prior art electronic file system has had a problem that, since even documents having data printed in their "face" and "back" sides are managed merely on the basis of the consecutive pages, insertion or deletion of an odd numbered page causes the "face"/"back" relationship to be undesirably shifted. By contrast, in the electronic file system of the present embodiment of the present invention having such an arrangement as mentioned above, when the both-side flag 24 is set at "1", the processing sheet number CNT is set at 2, so that, even when page addition or deletion is carried out, the page face/back relationship can be prevented from being destroyed without involving any troublesome operations such as insertion/deletion of a blank page.

Further, in accordance with the electronic file system of the present invention, when it is desired to manage such documents as, e.g., name cards having data printed in their both sides and to register them in the both-side mode and when the "face" side has data vertically printed and the "back" side has data horizontally printed; one of the "face" and "back" sides is rotated so that these documents can be registered and/or displayed with these representation (data-printed) orientations or directions (vertical and horizontal) unified to either one thereof.

The both-side mode basically includes such a mode that "face" and "back" are registered as associated with each other and are separately displayed as mentioned in the foregoing embodiment, and such a mode that the "face" and "back" are combined into a single-screen display, which will be explained later.

Accordingly, in the case where, due to the different representation directions of the "face" and "back" data, one of the "face" and "back" document sides is rotated to unify the representation directions to its either one and to register and/or display the documents; in the above separated face/back display mode, the "face" and "back" are both or either one (in this case, which representation direction is unified to the other one) subjected to a rotating operation or a scaling (enlarging/reducing) operation. In the above one-screen display mode corresponding to a combination of the face and back, on the other hand, the "face" and "back" are both or either one (in this case, which representation direction is unified to the other one) subjected to a rotating operation or a scaling (enlarging/reducing) operation and further subjected to a face/back combining operation to produce a single-screen display.

Figure 15:
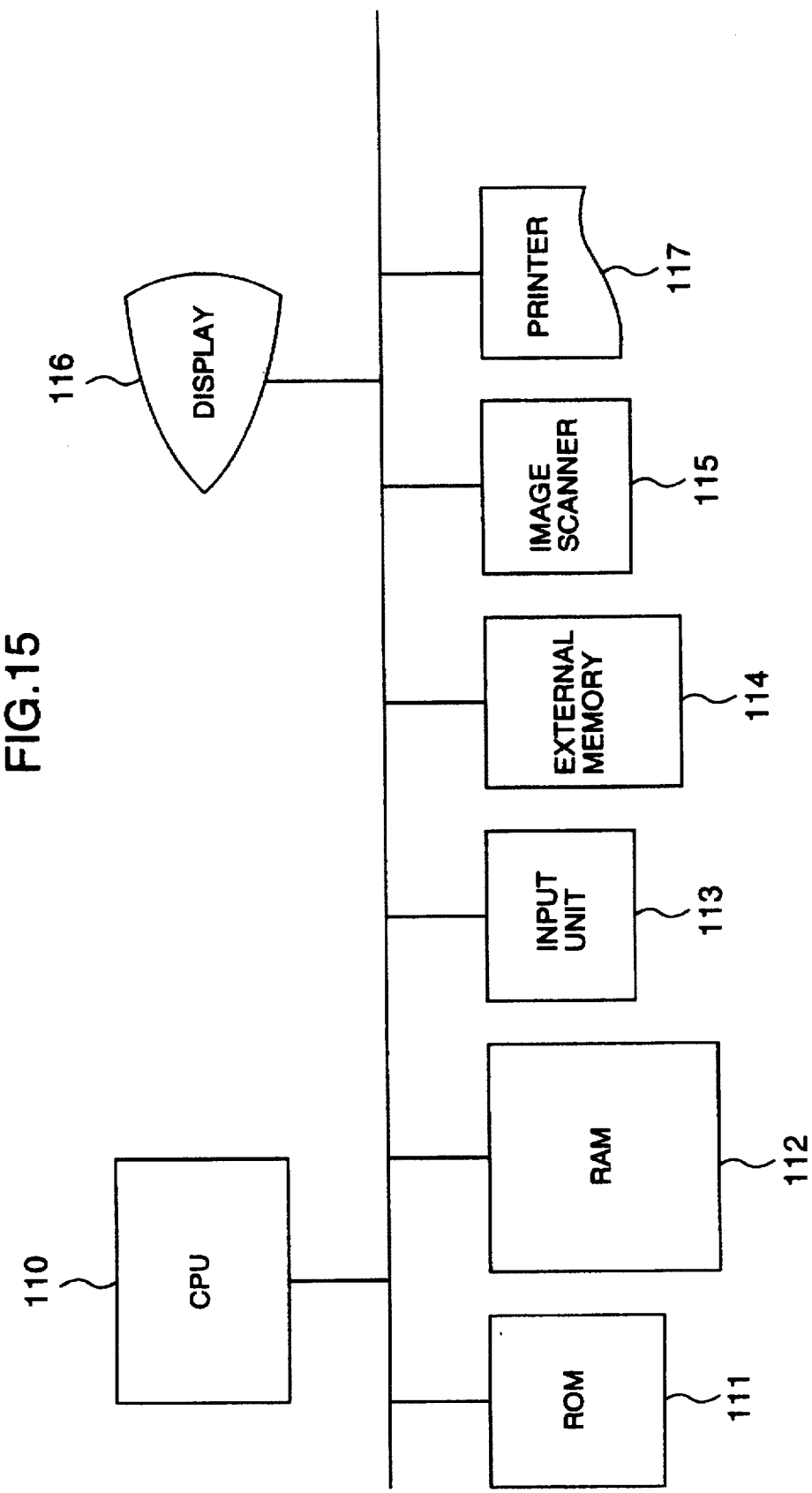
FIG. 15 is a block diagram of an electronic file system in accordance with another embodiment of the present invention.
Figure 20:
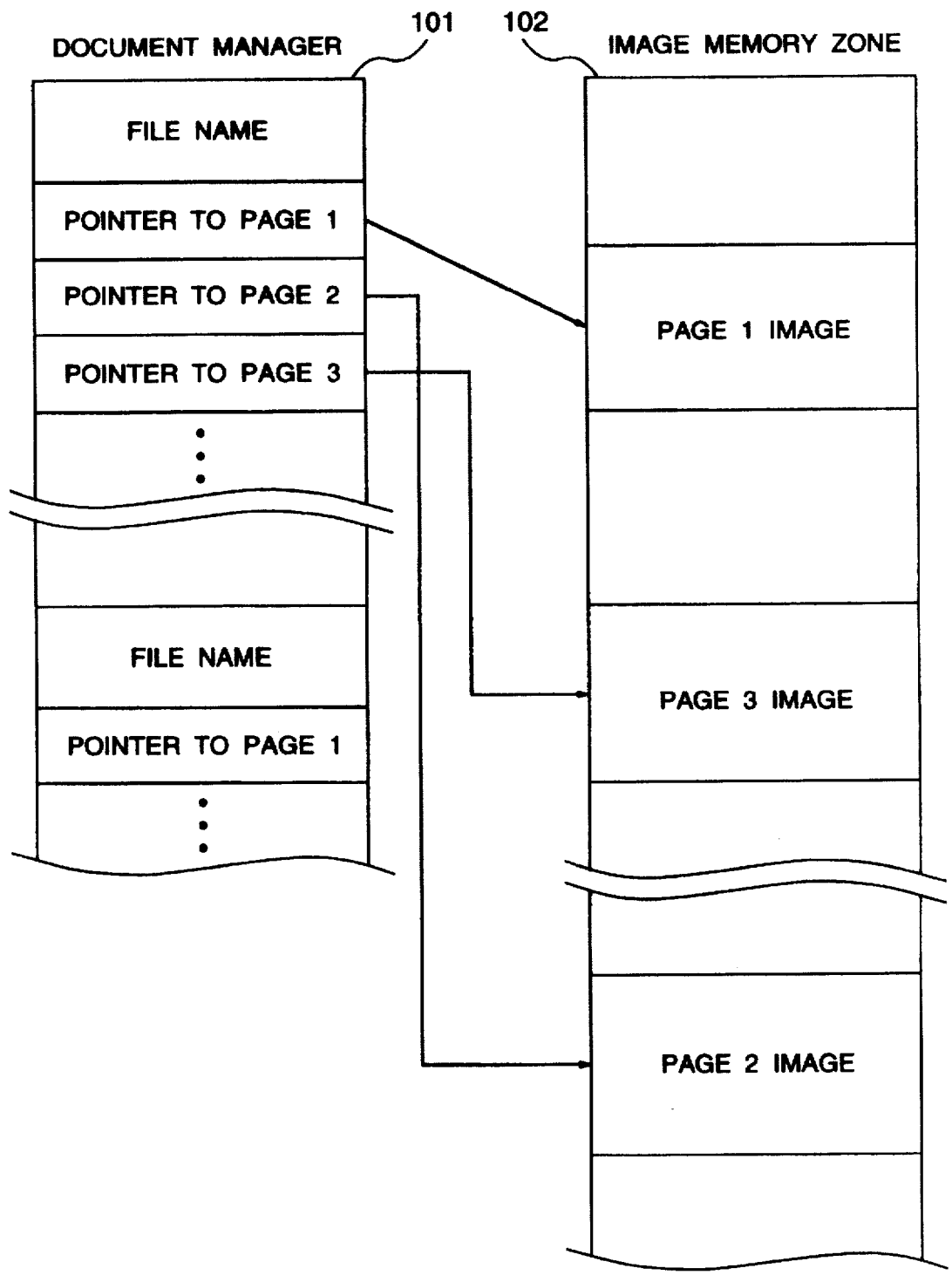
FIG. 20 is a data structure in a prior art electronic file system.

Explanation will then be made as to another embodiment of the present invention embodying the above method with reference to the drawings. FIG. 15 is a block diagram of an electronic file system in accordance with another embodiment of the present invention, which includes a CPU 110 for performing general control over the system and various sorts of data processing operations and a ROM 111 for storing programs therein, the CPU 110 being operated in accordance with the programs stored in the ROM 111. The illustrated system further includes a RAM 112 for temporarily storing therein image data and data being processed, an input unit 113, an external memory 114 such as a magneto-optical disk, an image scanner 115 for reading out information recorded on an original document therefrom as image data, a display 116 and a printer 117. In the illustrated example, the external memory 114 has substantially the same data structure as that of FIG. 20 in the prior art.

The operation of the electronic file system of the present embodiment arranged as mentioned above will be explained in connection with flowcharts of FIGS. 16, 17 and 18.

Figure 16:
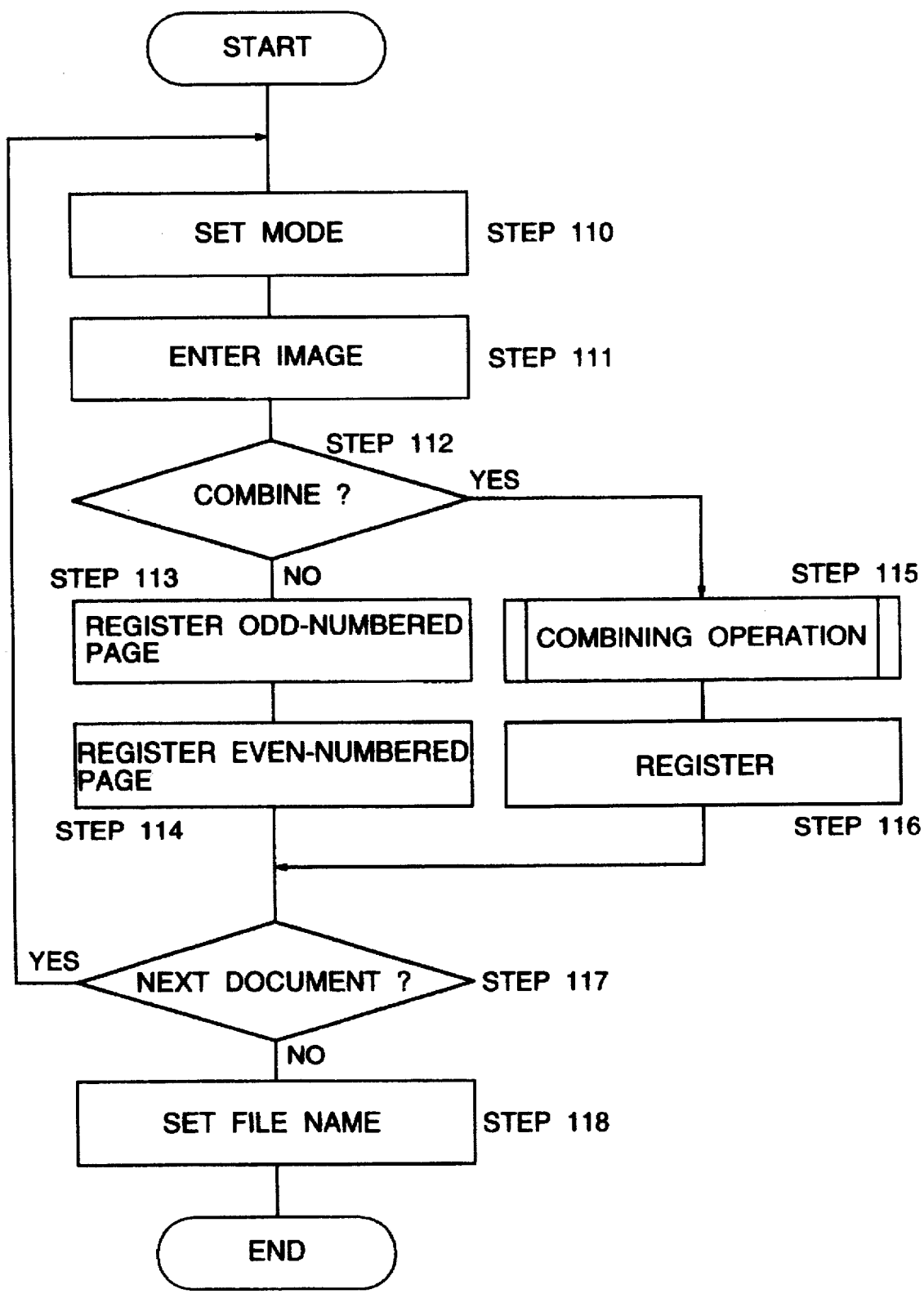
FIG. 16 is a flowchart for explaining an image registering operation in the embodiment.

In a step 110 of FIG. 16, first of all, the CPU 110 accepts a setting of the read mode through the input unit 113. The read mode includes a mode in which the images of the "face"/"back" of a document are handled as separate pages, a mode in which such images are handled as a single page, and modes in which the "face"/"back" of the document are displayed both vertically and horizontally respectively.

After the read mode is set, in a step 111, data on the "face"/"back" of the document is read out therefrom by the image scanner 115 and then the read image data is applied to the RAM 112. Then, the CPU 110 examines the set read mode and performs the operation corresponding to the mode in a step 112.

In the mode in which the images of the document "face"/"back" are handled as separated pages, the image data of the "face"/"back" read in the step 111 are registered as separated data in an image memory zone 102 of the external memory 114 in steps 113 and 114 (at which time, addresses at which the image data are written are registered in the file manager 101).

In the mode in which the images of the document "face"/"back" are handled as a single page, the images of the "face"/"back" read by the image scanner 115 are subjected to reducing/rotating operations and then to a synthesizing or combining operation into single-page data in a step 115, and the combined data is registered as single-page image data in the image memory zone 102 of the external memory 114 in a step 116 (at which time, the data is also registered in the file manager 101). Of course, it is also possible to subject not only the reducing operation but also the enlarging operation.

After the image registering operation is completed according to the mode, the state of the image scanner 115 is checked in a step 117 so that, when the next original document is set, control returns to the step 110 to repeat the above operation; while, when the next document is not set, control goes to a step 118 to register the file name in the file manager 101, after which the operation ends.

Figure 17:
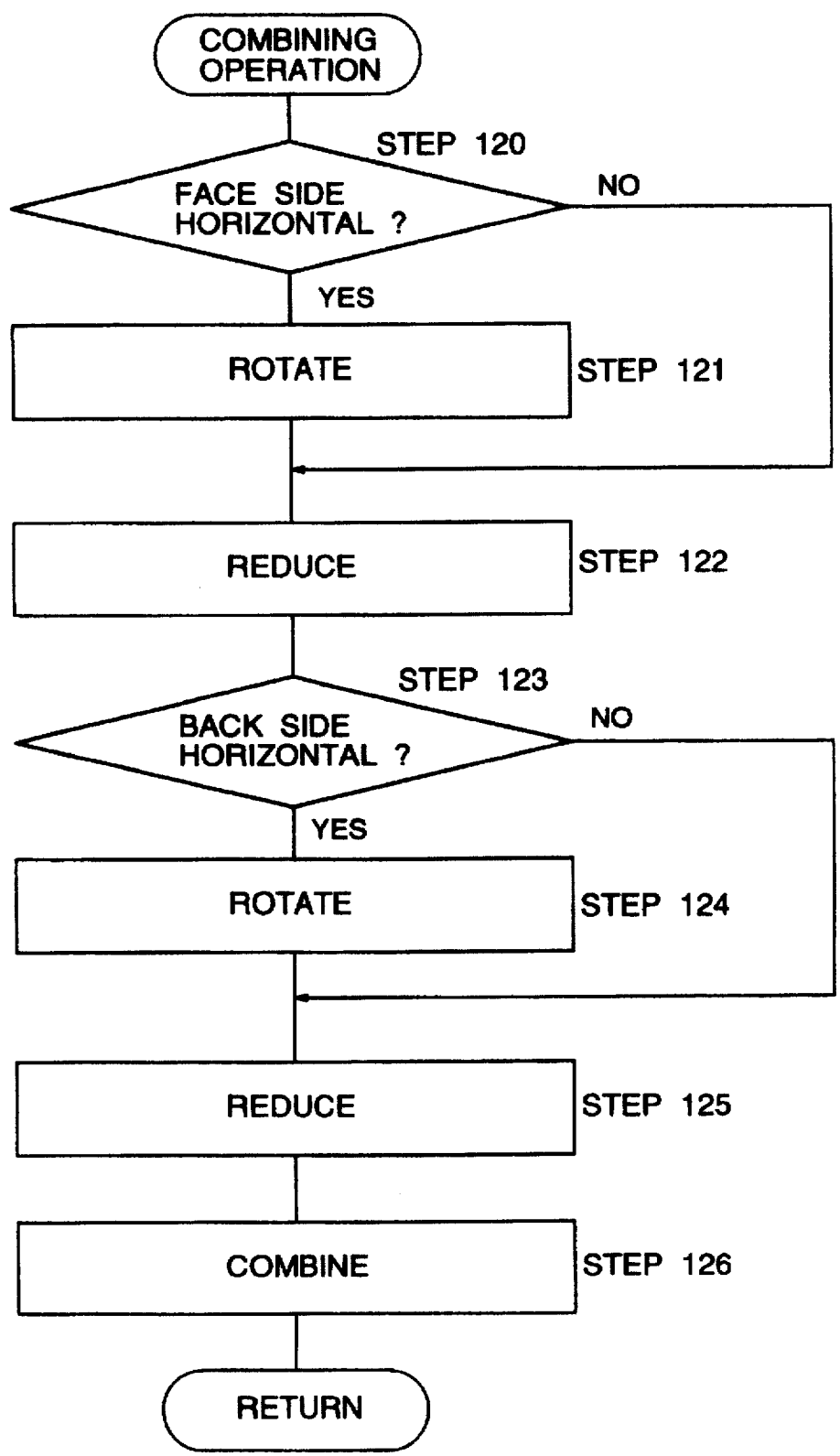
FIG. 17 is a flowchart for explaining an image synthesizing operation in the embodiment.
Figure 18:
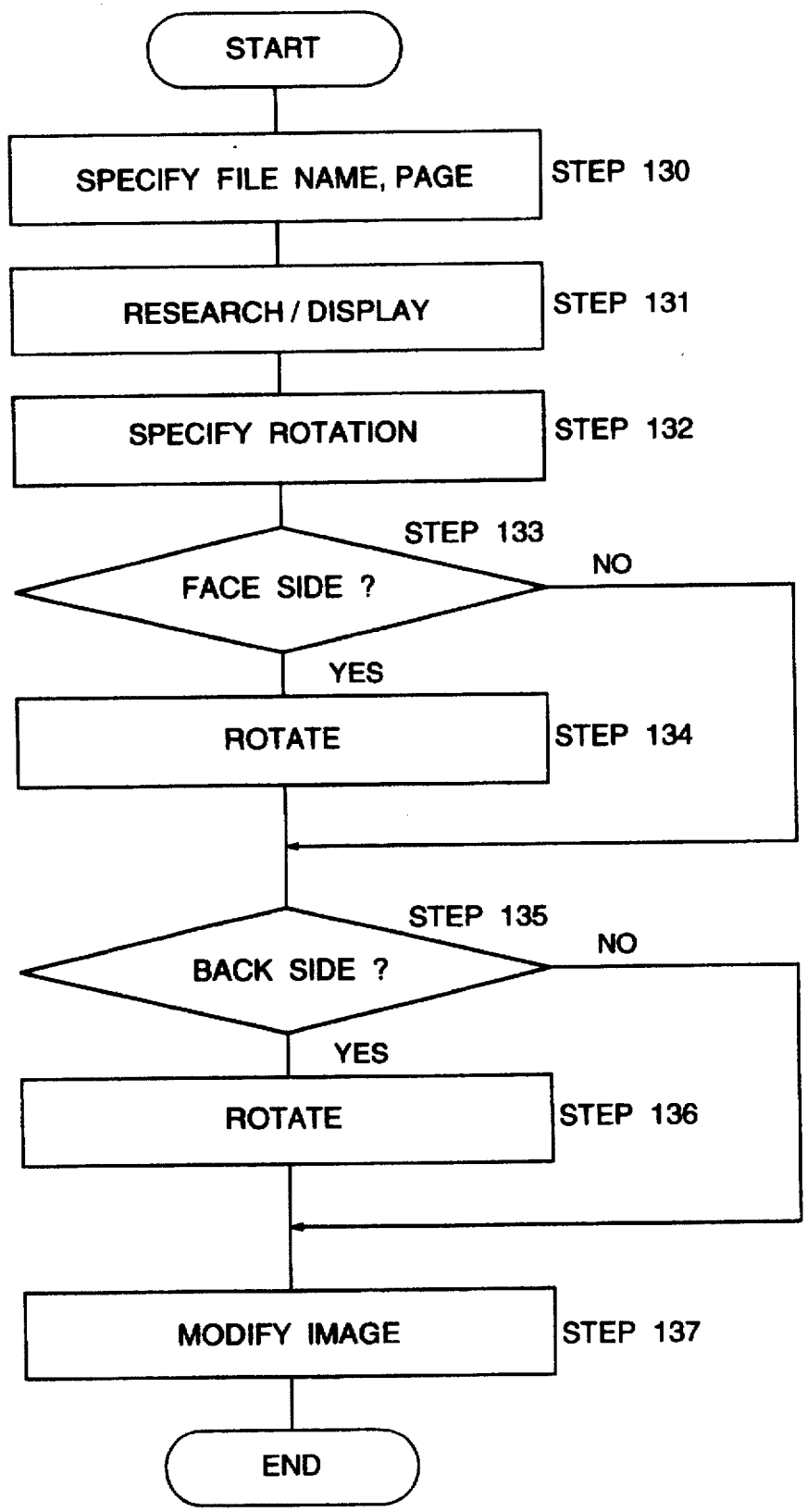
FIG. 18 is a flowchart for explaining an image modifying operation in the embodiment.

Explanation will then be made as to the image combining operation of the step 115 with use of FIG. 17. In a step 120, first of all, the CPU 110 examines the vertical/horizontal printed data of the document "face" according to the mode set in the step 110 of FIG. 17. When the "face" has horizontally-printed data, the image data of the "face" side is rotated by an angle of 90 degrees to be set at its erected image position in a step 121 of FIG. 17, after which the data is subjected to a ½ size reducing operation in a step 122. Then when the CPU 110 examines the vertical/horizontal printed data of the document "back" and determines that the "back" data is horizontally printed in a step 123, the image data of the "back" side is subjected to a 90-degree rotating operation to be set at its erected position in a step 124, after which the data is subjected to a ½ size reducing operation in a step 125. After the both image data of the "face" and "back" sides are subjected to the reducing operation, the reduced image data are subjected to a combining operation into image data corresponding to one page in a step 126.

Figure 19:
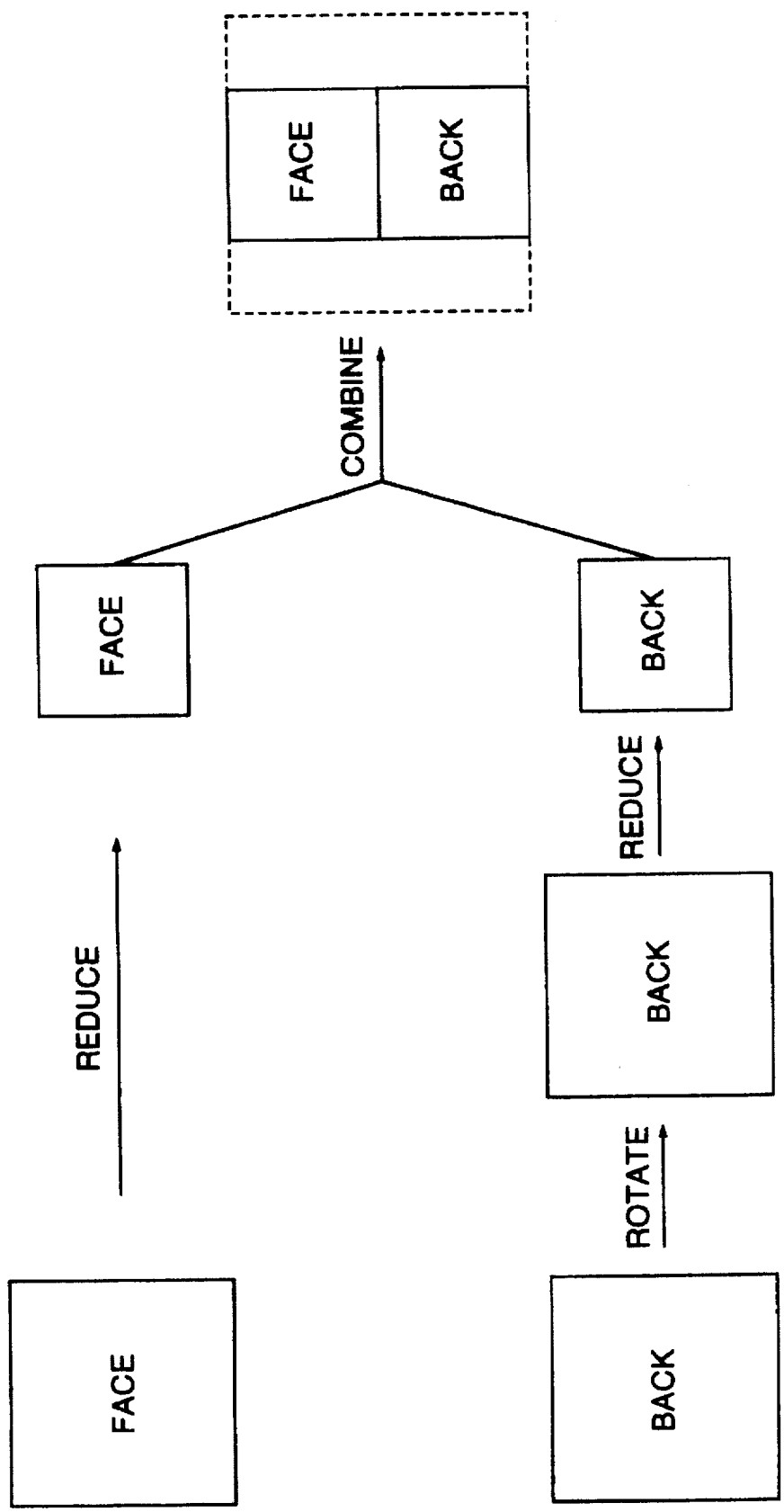
FIG. 19 is a diagram for explaining the image synthesizing operation in the embodiment.

Shown in FIG. 19 is an example in which data on the "face" side of a document vertically printed and data on the "back" side thereof are combined into image data corresponding to one page and then the one-page data is registered. In more detail, the image of the "face" side is subjected to a reducing operation with its orientation kept as it is while the image of the "back" side is subjected to rotating/reducing operations, after which the images of the "face"/"back" are combined into single-image data.

When the document having data printed in its "face" and "back" sides is registered in the electronic file system through the above operations, the "face"/"back" data have the same or very similar contents, so that, when it is desired for the "face"/"back" data of the searched document to be output onto the same display screen or the same printing sheet, the "face"/"back" images can be handled as a single image, thereby realizing simple and high-speed operation.

Further, even when a document has "face"/"back" sides differently printed vertically and horizontally respectively, specification of a mode during image input causes the images of the "face"/"back" sides to be registered with their orientations aligned in the combined data, whereby such image data can be displayed in a visually easy manner during the image output.

The present embodiment further offers such a function that allows easy modification of combined image data once registered.

The modifying operation of the combined image will be explained with use of a flowchart of FIG. 18. When the file name of image data to be modified and a corresponding page number are specified through the input unit 113 in a step 130, the corresponding image data is read out from the external memory 114 and loaded in the RAM 112 and then displayed on the display 116 in a step 131. In a step 132, either one of the "face"/"back" images of the combined document to be rotated is specified through user's mode selection to perform operations defined in a step 133 and subsequent steps.

More specifically, either one of the "face"/"back" to be rotated is specified at the step 133 or 135 and the corresponding part (upper half of the combined image data when the "face" side is rotated; while lower half of the combined image data when the "back" side) of the combined "face"/"back" image data is rotated by an angle of 90 degrees in a step 134 or 136, after which the image data within the external memory 114 is modified on the basis of the image data after the modification in a step 137.

As has been disclosed in the foregoing, in accordance with the electronic file system of the present invention, since the system has the concatenation information between an odd numbered page as one of the "face"/"back" sides of a document sheet and an even numbered page as the other thereof, the sheet "face" and "back" sides can be handled as linked and thus the user can easily handle the document having information printed on its face and back sides.

What is claimed is:

1. An electronic file system comprising:
   image reading means for reading a document sheet as image data, the document sheet having face and back sides;
   document data management means for storing information on concatenation between the face side of the document sheet and the back side of the document sheet;
   display means for displaying one of the face and back sides of the document sheet and the concatenation information; and
   a single turn-over means for alternately switching between the face and back sides of the document sheet for display by the display means.

2. An electronic file system as set forth in claim 1, further comprising image processing means for subjecting the image data to an enlarging, reducing and/or rotating operation.

3. An electronic file system as set forth in claim 1, wherein:

the document data management means comprises means for storing information on concatenation among a plurality of odd-numbered pages and a plurality of even-numbered pages;

one of the face and back sides of the document sheet is one of the plurality of odd-numbered pages; and another of the face and back sides of the document sheet is one of the plurality of even-numbered pages.

4. An electronic file system as set forth in claim 1, wherein:

the display means comprises means for displaying a representation of the single turn-over means; and the single turn-over means comprises means for receiving a user input corresponding to the representation of the single turn-over means displayed by the display means.

* * * * *